Patented Nov. 26, 1929

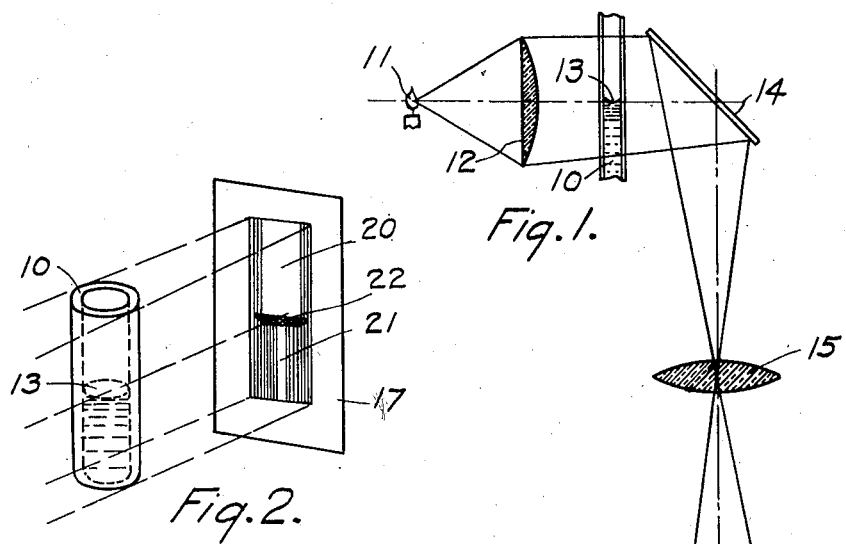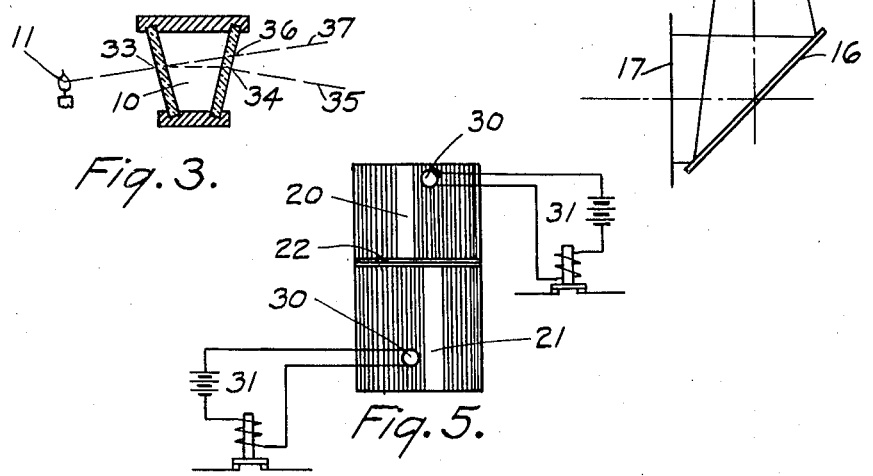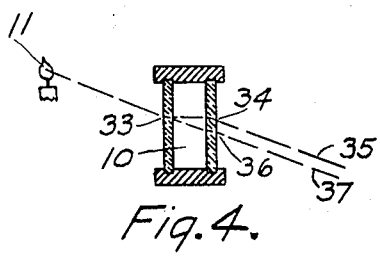

1,737,126

UNITED STATES PATENT OFFICE

GEORGE REYLING, OF MINEOLA, NEW YORK, AND FRANK LIMING PLATT, OF NEW MARKET, NEW JERSEY

LIQUID-LEVEL INDICATOR

Application filed May 24, 1927. Serial No. 193,867.

The invention relates to a device for indicating the level of liquids and has for its object the production of a simple device whereby the level of the liquid may be seen at great distance and/or on different levels from the gage or column commonly employed for the purpose.

The reading of the liquid level in a gage or column is difficult when the observer is at a distance away from the gage and/or when he is on a different level.

It has been attempted in the past to observe the liquid level at a distance by means of reflectors, the result of which is that the column appears small and is visible only when the observer is exactly in the path of the reflected light. This in itself presents a very unsatisfactory result and is of limited use as well as impossible when the gage or column becomes dirty or translucent from other causes.

The general object of the invention is to overcome these difficulties and to produce a simple means and method of projecting the image of the liquid level gage with its contained liquid and vapor to any convenient point.

As the refractive indices of a liquid and its vapor, or any other gas vary in general as the direct ratio of the density of the substances, this invention utilizes this property to so distort rays of light passing through the column or gage that the projected rays of light passing through the liquid portion of the column will form a differently appearing image than those rays passing through the vapor filled portion of the column. The deflection of the rays of light striking the meniscus at the surface of the liquid is utilized by a suitable optical or projection system to throw an image on a screen so that as the height of the liquid varies, such variation can be seen on the screen or board placed at a convenient point above or below or horizontally distant from the column or gage.

This image of the meniscus which varies together with the movement of the liquid in the column or gage comprises zones of lights and shadows which we utilize for the purpose of operating light sensitive electric cells for closing or opening an electric circuit as a high and/or low liquid level alarm or may be utilized otherwise as conditions may require.

The foregoing and other features of our invention will now be described in connection with the accompanying drawing forming part of this specification in which we have represented our liquid level indicator in its preferred form after which we shall point out in the claims those features which we believe to be new and of our joint invention.

In the drawings:

Figure 1 is a diagrammatic sketch illustrating the operation of our invention through a preferred form of optical systems.

Figure 2 illustrates the image produced by projecting a light source through the liquid level gage.

Figures 3 and 4 show a modified cross section of the liquid level gage.

Figure 5 shows the form of image when the gage as illustrated in Figures 3 or 4 is used.

In the carrying out of our invention we utilize any standard liquid level or gage or column 10 which may be a simple round glass tube as illustrated in Figures 1 and 2 or it may have any cross section as illustrated in Figures 3 and 4. A source of light 11 by means of a condensing lens 12 is projected through the gage 10. We have indicated the gage substantially half full of liquid by the line 13 which is curved showing the usual meniscus found at the top of all liquid confined in a tube. The silhouette of the meniscus is thrown on a mirror 14 and focused by any well known means 15 on a screen or mirror 16 and in the latter event it is finally projected on a screen 17.

The silhouette thus formed is illustrated in Figure 2. The upper half, showing a wide white central line 20 is due to rays of light passing through the glass and vapor or gas above the liquid, while the narrow white central line in the lower half is due to less number of rays of light passing through the liquid. These different widths of the white spaces are due to the difference of refraction of light for the liquid and its vapor or other gas in the gage 10, the light rays passing through them forming the image. The black central line 22 is caused by the meniscus formed on the top of the liquid, which cuts off all the light rays from the light source. This image or silhouette will vary with the shape of the transparent or translucent tube, with different liquids and the angularity of the rays leaving the condenser lens 12. The typical image shown in Figure 2 is that formed when a round gage is used such as a standard water gage.

Should a gage of different cross section be used as, for example, one substantially like that shown in Figure 3 and Figure 4, the silhouette of the meniscus would resemble that shown in Figure 5. In this latter case as shown in Figures 3 and 4 rays of light from source 11 will be refracted to a greater extent in passing through the liquid filled portion of the column as shown by line 11, 33, 34 and 35 than they will in passing through the vapor or gas filled portion of the column as indicted by line 11, 33, 36 and 37.

With an image thus formed comprising lights and shadows, we can utilize light sensitive electric control cells 30 which may be located in the path of the varying light rays and connected with any electric system, the circuit of which shown is indicated at 31. When the image travels so that one of these cells falls in the path of the light rays the electric current passing through the cell will vary in intensity due to the action of the light rays and this variation in current intensity can be utilized by relays or other means to control alarms or other equipment It will be readily understood that the location of these light sensitive cells may be any place within the optical system so long as they are placed in zones of light and shadow due to the varying level of the liquid in the column or gage. It will thus be seen that our invention not only serves as a liquid level indicator but it also may be utilized as a high and low liquid level alarm.

Our system is particularly valuable as an accessory to modern boilers, hot wells, condensers and other liquid containers to indicate the level of the water contained therein. It is well known that the liquid gages become dirty and otherwise translucent in which event it is impossible to see the level of the liquid with the eye. With our invention, however, the transparency of the liquid gage or column does not materially affect the results as our invention depends upon the variation in refractive indices between the liquid and vapor filled portion of the column and not upon the transparency of the column itself. With our invention the column may even be translucent, as it does not materially affect the image produced so long as some of the light rays pass through the column. With the installation of our system it will therefore be unnecessary to change the water glasses so often or if ever.

We wish it distinctly understood that our liquid level indicator herein described and illustrated is in the form in which we desire to construct it but that changes or variations may be made as may be convenient or desirable without departing from the salient features of our invention and we therefore intend the following claims to cover such modifications as naturally fall within the lines of invention.

We claim:—

1. In a liquid level indicator, a liquid column with its contained liquid and vapor, a source of light projected through the column, an optical system to transmit the image of the water and vapor, light sensitive electric cells connected to operate a relay located in the zones of lights and shadows of varying light intensity due to the different refractions of water and vapor, whereby the variation of liquid level will operate the cells and control the relay.

2. In a liquid level indicator, a liquid column with its varying level of liquid and vapor, light sensitive cells spaced apart and controlling the energization of an electrical circuit including a relay means to project rays of light through the liquid and vapor so that the varying light intensities due to the different refractions of the liquid, vapor and meniscus will fall upon the light sensitive cells when the varying level of liquid reaches a predetermined point whereby the cells become actively affected controlling their respective relays.

In testimony whereof we affix our signatures.

GEORGE REYLING.
FRANK LIMING PLATT.